US010587498B2

(12) United States Patent
Zee et al.

(10) Patent No.: US 10,587,498 B2
(45) Date of Patent: Mar. 10, 2020

(54) METHODS AND ARRANGEMENTS FOR MULTIPATH TRAFFIC AGGREGATION

(71) Applicant: Telefonaktiebolaget LM Ericsson (publ), Stockholm (SE)

(72) Inventors: Oscar Zee, Stockholm (SE); Tomas Hedberg, Stockholm (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 12 days.

(21) Appl. No.: 15/556,772

(22) PCT Filed: Mar. 12, 2015

(86) PCT No.: PCT/SE2015/050280
§ 371 (c)(1),
(2) Date: Sep. 8, 2017

(87) PCT Pub. No.: WO2016/144224
PCT Pub. Date: Sep. 15, 2016

(65) Prior Publication Data
US 2018/0062979 A1    Mar. 1, 2018

(51) Int. Cl.
*H04L 12/709* (2013.01)
*H04W 80/06* (2009.01)
(Continued)

(52) U.S. Cl.
CPC ............ *H04L 45/245* (2013.01); *H04L 67/14* (2013.01); *H04L 67/141* (2013.01);
(Continued)

(58) Field of Classification Search
CPC combination set(s) only.
See application file for complete search history.

(56) References Cited

U.S. PATENT DOCUMENTS

2012/0099601 A1* 4/2012 Haddad ............. H04L 29/12405
370/401
2012/0331160 A1* 12/2012 Tremblay ................ H04L 69/14
709/228
(Continued)

FOREIGN PATENT DOCUMENTS

WO    WO 2012/099762 A1    7/2012
WO       2014068062 A1    5/2014
(Continued)

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.5.0, Jun. 2014, 1-305.
(Continued)

*Primary Examiner* — Hicham B Foud
(74) *Attorney, Agent, or Firm* — Sage Patent Group

(57) ABSTRACT

The present disclosure relates to methods and arrangements for multipath traffic aggregation using a multipath Transmission Control Protocol, MPTCP, proxy. A method of relaying data between an MPTCP capable wireless device and a server is performed in a multipath Transmission Control Protocol, MPTCP, proxy, configured with a unique Internet Protocol, IP, address. The comprises establishing (S33) an MPTCP session between the MPTCP proxy and the wireless device, the MPTCP session comprising a first MPTCP subflow mapped on a first network path for the wireless device using a default traffic flow tuple, and establishing (S35) a TCP session with the server. The method further comprises initiating (S37) a further MPTCP subflow in the MPTCP session between the MPTCP proxy and the wireless device based on a mapping of the further MPTCP subflow to a second network path for the wireless device (Continued)

using a filtering traffic flow tuple comprising the unique IP-address configured for the MPTCP proxy. Data is relayed (S39) between the wireless device and the server, wherein data between the MPTCP proxy and the wireless device is exchanged in the MPTCP session comprising the first MPTCP subflow on the first network path and the further MPTCP subflow on the second network path and wherein data between the MPTCP proxy and the server is exchanged in the TCP session.

12 Claims, 8 Drawing Sheets

(51) Int. Cl.
H04W 76/15 (2018.01)
H04L 29/08 (2006.01)
H04L 29/06 (2006.01)

(52) U.S. Cl.
CPC .......... H04L 67/2833 (2013.01); H04L 69/14 (2013.01); H04L 69/16 (2013.01); H04W 76/15 (2018.02); H04W 80/06 (2013.01)

(56) References Cited

U.S. PATENT DOCUMENTS

| 2015/0095502 A1* | 4/2015 | Le Bolzer | H04L 45/24 709/227 |
| 2016/0112239 A1* | 4/2016 | Kanugovi | H04W 88/16 370/338 |
| 2016/0135222 A1* | 5/2016 | Jain | H04W 74/04 370/329 |
| 2017/0104717 A1* | 4/2017 | Vesterinen | H04W 8/26 |
| 2017/0231018 A1* | 8/2017 | Hahn | H04W 76/10 |

FOREIGN PATENT DOCUMENTS

| WO | 2014090335 A1 | 6/2014 |
| WO | 2015030641 A1 | 3/2015 |

OTHER PUBLICATIONS

Unknown, Author, "RAN2 agreed CRs on Core part: Dual connectivity for LTE", 3GPP TSG RAN Meeting #66, RP-142135, Dec. 8-11, 2014, 1-2.
Wei, X. et al., "MPTCP Proxy Mechanisms", Internet—Draft, Huawei Technologies, Jun. 30, 2014, 1-12.
Office action for EP application No. 15884810.1, dated Feb 15, 2018 , 2 pages.
Wei C Xiong, Huawei Technologies E Lopez Fortinet X; "MPTCP Proxy mechanisms; draft-wei-mptcp-proxy-mechanism-01. txt", MPTCP Proxy Mechanisms; Draft-WEI-MPTCP-Proxy-Mechanism-01. txt, Internet Engineering Task Force, IETF standard working Draft, internet society (ISOC) 4, Rue Des Falaises CH-1205 Geneva, CH. Mar. 9, 2015, pp. 1-11 Mar. 9, 2015 XP015105382, [retrieved on Mar. 9, 2015]*paragraphs [0001]-[04.2]; figures1,2,4*.
IETF RFC 6824: "TCP Extensions for Multipath Operation with Multiple Addresses; rfc6824. tct" TCP Extensions for Multipath Operation With Multiple Addresses; RFC6824. TXT Internet Engineering Task Force, IETF;Standard, Internet Society (ISOC) 4,Rue Des Falaises CH-1205 Geneva, CH, Jan. 17, 2013 (Jan. 17, 2013), pp. 1-64, XP015086539*the whole doc*.

* cited by examiner

METHODS AND ARRANGEMENTS FOR MULTIPATH TRAFFIC AGGREGATION

TECHNICAL FIELD

The present disclosure relates to methods and arrangements for multipath traffic aggregation using a multipath Transmission Control Protocol, MPTCP, proxy.

BACKGROUND

Transmission Control Protocol, TCP, is the most dominant protocol used in computer networking and on the Internet. TCP is a connection-oriented protocol, where devices at the end points, nodes, establish a connection before any data is sent during a TCP session.

In a session establishment phase, also known as a call set up phase, control data is passed between the nodes to establish a connection. The TCP protocol uses a three way handshake protocol to synchronize and to establish a TCP connection between two nodes. The TCP connection is initiated by a source node sending a synchronization, SYN, packet toward a destination node. The destination node acknowledges receipt of the SYN packet with a SYN-ACK packet sent toward the source node. Upon receipt of the SYN-ACK packet from the destination node, the source node responds with an acknowledgement, ACK, packet thereby concluding the establishment phase. During this 3-way handshake the hosts negotiate the connection settings.

Once the connection is set up, data transmission during the TCP session is controlled by three factors: the rate at which the source is willing to send data, controlled by the congestion control algorithm; the TCP window space advertised by the destination; and the rate at which data appears to be getting delivered to the destination as determined by the ACK packets received at the source from the destination.

Multipath TCP, MPTCP, allows a TCP session to use multiple paths to maximize resource usage. MPTCP has one main TCP flow and one or more TCP subflows for every TCP session and is capable of distributing load on all interfaces, for example by having the main TCP flow and the one or more TCP subflows on different interfaces such as a 3GPP-based interface and a Wi-Fi/WLAN based interface with separate IP-addresses. As the multiplexing of different connections is on TCP level it allows separate congestion control for each subflow.

MPTCP is an end-to-end protocol which requires both hosts to support MPTCP to benefit from MPTCP. Since, MPTCP is still in its early stage of deployment, probabilities that every host on the Internet supports MPTCP are very low. To overcome this problem and benefit from MPTCP even though both communicating hosts do not support MPTCP, an MPTCP proxy may be used to convert MPTCP flows to TCP and vice versa.

The main scenario for MPTCP is for a wireless device is capable of both LTE connection and Wi-Fi connection. For using MPTCP in an LTE-only case the main scenario is the case when an MPTCP capable wireless device is associated with two or more LTE PDN connections having their own IP addresses, making it possible to route an MPTCP main flow and one or more MPTCP subflows on different LTE carriers using these different IP addresses. In the case of two LTE PDN connections, there will exist at least two bearers which the MPTCP main flow and the subflow can be transmitted on; allowing RAN logic to have these bearers on different LTE carriers based on for example LTE Dual Connectivity or LTE Carrier Aggregation.

The need for IP-addresses is ever increasing, so to the point that IP addresses are considered as a scarce resource that need to be preserved. As the number of multipath capable wireless devices increases, this will further limit the availability of IP-addresses that may be assigned to a communication interface. There is a need to improve efficiency in IP address use during an MPTCP session.

The need for improved IP address efficiency has been addressed in the MPTCP specification in that the specification also supports MPTCP on a wireless device associated with one LTE PDN connection. A state of the art solution enabling multiple TCP flows in such a scenario involves a use of different TCP ports for the different bearers, e.g. MPTCP main flows and subflows on separate TCP port ranges. This is a working solution, but would require an agreement for example in the standard on port ranges to use.

Thus, there is a need for further solutions to support MPTCP on a wireless device associated with one LTE PDN connection.

SUMMARY

An object of the present disclosure is to provide methods and arrangements for multipath traffic aggregation which seeks to mitigate, alleviate, or eliminate one or more of the above-identified deficiencies in the art and disadvantages singly or in any combination.

The object is achieved by a method, performed in a multipath Transmission Control Protocol, MPTCP, proxy, configured with a unique Internet Protocol, IP, address, of relaying data between an MPTCP capable wireless device and a server. The method comprises establishing an MPTCP session between the MPTCP proxy and the wireless device, the MPTCP session comprising a first MPTCP subflow mapped on a first network path for the wireless device using a default traffic flow tuple, and establishing a TCP session with the server. The method further comprises initiating a further MPTCP subflow in the MPTCP session between the MPTCP proxy and the wireless device based on a mapping of the further MPTCP subflow to a second network path for the wireless device using a filtering traffic flow tuple comprising the unique IP-address configured for the MPTCP proxy. Data is relayed between the wireless device and the server, wherein data between the MPTCP proxy and the wireless device is exchanged in the MPTCP session comprising the first MPTCP subflow on the first network path and the further MPTCP subflow on the second network path and wherein data between the MPTCP proxy and the server is exchanged in the TCP session.

The proposed disclosure enables multipath TCP connections for MPTCP capable wireless devices each having a single PDN connection, i.e. using only a single IP address in the wireless device for the PDN connection.

According to an aspect of the disclosure, the MPTCP capable wireless device comprises a communication interface having a single IP address.

According to further aspects of the disclosure, the communication interface is a 3GPP LTE radio interface for an LTE PDN connection and the traffic flow tuple is a Traffic Flow Template, TFT or an IP Flow Mobility, IFOM, interface for an IFOM PDN connection and wherein routing rules define which traffic on the IFOM PDN connection that is to be sent using an LTE access and which is to be sent using a Wi-Fi/WLAN access.

Consequently, the present disclosure presents solutions operational in a 3GPP LTE environment as well as in an IFOM environment without impacting the respective standards for communication over the interfaces. That is, providing solutions that are robust and easy to implement in existing standardized interfaces.

According to an aspect of the disclosure, the method comprises intercepting a Traffic Control Protocol, TCP connection request or an MPTCP connection request from the wireless device to a server and determining that the wireless device is a multipath capable wireless device.

According to an aspect of the disclosure, the method comprises verifying establishment of the second network path when establishing a TCP session.

According to an aspect of the disclosure, the method comprises sending information on the IP address configured for the MPTCP proxy to the wireless device when initiating at least one further TCP subflow.

According to another aspect of the disclosure, wherein the initiating of the at least one further MPTCP subflow comprises activating the second network path via Rx-based signalling from the MPTCP-proxy to a Policy and Charging Rules Function, PCRF with information about the additional unique MPTCP proxy IP-address and a wireless device identifier.

According to other aspects of the disclosure, the method comprises relaying data between the wireless device and the server, wherein data between the MPTCP proxy and the wireless device is exchanged in the MPTCP session comprising a first MPTCP subflow and a further MPTCP subflow and wherein the relaying comprises merging data received in the first MPTCP subflow and in the further MPTCP subflow to the TCP flow and/or splitting data received in the TCP flow to the first MPTCP subflow and the further MPTCP subflow.

The present disclosure presents solutions applicable to enable MPTCP flows both in an uplink and downlink direction in a radio access network, depending only on a single IP-address for the MPTCP data session.

According to a further aspect of the disclosure, an additional MPTCP flow is included in the MPTCP session between the wireless device and the MPTCP proxy on an additional network path using an additional filtering traffic flow tuple comprising an additional unique IP-address of the MPTCP proxy and/or a unique port number of an MPTCP port.

The present disclosure presents solutions applicable also for setting up a plurality of MPTCP subflows, for MPTCP capable wireless devices each having a single PDN connection, i.e. using only a single IP address in the wireless device for the PDN connection The object of the disclosure is also achieved by a multipath Transmission Control Protocol, MPTCP, proxy comprising processing circuitry operative to relay data between an MPTCP capable wireless device and a server. The processing circuitry is adapted to establish an MPTCP session between the MPTCP proxy and the wireless device, the MPTCP session comprising a first MPTCP subflow mapped on a first network path for the wireless device using a default traffic flow tuple and establish a TCP session with the server. The processing circuitry is further adapted to initiate a further MPTCP subflow in the MPTCP session between the MPTCP proxy and the wireless device based on a mapping of the further MPTCP subflow to a second network path for the wireless device using a filtering traffic flow tuple comprising the unique IP-address configured for the MPTCP proxy and to relay data between the wireless device and the server, wherein data between the MPTCP proxy and the wireless device is exchanged in the MPTCP session comprising the first MPTCP subflow on the first network path and the further MPTCP subflow on the second network path and wherein data between the MPTCP proxy and the server is exchanged in the TCP session.

The object of the disclosure is also achieved by a computer-readable storage medium having stored thereon a computer program which, when run in a multipath Transmission Control Protocol, MPTCP, proxy causes the network node to perform the previously disclosed method.

The MPTCP proxy and the computer-readable storage medium each display advantages corresponding to advantages described for the corresponding methods and aspects of the methods.

The object of the disclosure is also achieved by a method, performed in a multipath Transmission Control Protocol, MPTCP, capable wireless device, of setting up a Transmission Control Protocol, TCP, data exchange with a server. The method comprises establishing an MPTCP session to an MPTCP proxy configured to intercept a TCP connection request or MPTCP connection request from the wireless device to a server, the MPTCP session comprising a first MPTCP subflow mapped on a first network path using a default traffic flow tuple. The method further comprises including a further MPTCP subflow in the MPTCP session to the MPTCP proxy, the further TCP subflow mapped on a second network path using a filtering traffic flow tuple comprising a unique IP-address configured for the MPTCP proxy and exchanging data in an MPTCP session with the MPTCP proxy, filtering data on the first TCP subflow on the first network path and on the further TCP subflow on the second network path; the data being relayed to the server in a TCP flow in a TCP session between the MPTCP proxy and the server.

The proposed disclosure enables multipath TCP connections for a MPTCP capable wireless device having a single PDN connection, i.e. using only a single IP address in the wireless device for the PDN connection. Thus, IP address space can be saved, as instead of assigning each client with an extra IP address, one additional single IP address on the side of the MPTCP proxy will be able to serve the entire network using a traffic flow tuple for bearer mapping.

According to an aspect of the disclosure, the method performed in an MPTCP capable wireless device further comprises receiving information on the unique IP address configured for MPTCP proxy; and initiating a further MPTCP subflow between the wireless device and the MPTCP proxy based on a mapping of the further TCP subflow to a second network path using a filtering traffic flow tuple comprising the unique IP-address configured for the MPTCP proxy.

According to an aspect of the disclosure, the MPTCP capable wireless device comprises a communication interface having a single IP address.

According to further aspects of the disclosure, the communication interface is a 3GPP LTE radio interface for an LTE PDN connection and the traffic flow tuple is a Traffic Flow Template, TFT or an IP Flow Mobility, IFOM, interface for an IFOM PDN connection and wherein routing rules define which traffic on the IFOM PDN connection that is to be sent using an LTE access and which is to be sent using a Wi-Fi/WLAN access.

Consequently, the present disclosure presents solutions operational in a 3GPP LTE environment as well as in an IFOM environment without impacting the respective standards for communication over the interfaces. That is, providing solutions that are robust and easy to implement in existing standardized interfaces. In particular, a standard MPTCP stack without restrictions on port usage or IP address usage can be applied.

According to a further aspect of the disclosure, an additional MPTCP flow is included in the MPTCP session between the wireless device and the MPTCP proxy on an additional network path using an additional filtering traffic flow tuple comprising an additional unique IP-address of the MPTCP proxy and/or a unique port number of an MPTCP port.

The present disclosure presents solutions applicable also for setting up a plurality of MPTCP subflows, for an MPTCP capable wireless device having a single PDN connection, i.e. using only a single IP address in the wireless device for the PDN connection The object of the disclosure is also achieved by a multipath Transmission Control Protocol, MPTCP, capable wireless device comprising processing circuitry adapted to establish an MPTCP session to an MPTCP proxy configured to intercept a TCP connection request or MPTCP connection request from the wireless device to a server, the MPTCP session comprising a first MPTCP subflow mapped on a first network path using a default traffic flow tuple. The processing circuitry of the MPTCP capable wireless device is further adapted to include a further MPTCP subflow in the MPTCP session to the MPTCP proxy, the further TCP subflow mapped on a second network path using a filtering traffic flow tuple comprising a unique IP-address configured for the MPTCP proxy and to exchange data in MPTCP session with the MPTCP proxy, filtering data on the first TCP subflow on the first network path and on the further TCP subflow on the second network path; the data being relayed to the server in a TCP flow in a TCP session between the MPTCP proxy and the server.

The object of the disclosure is also achieved by a computer-readable storage medium having stored thereon a computer program which, when run in a multipath Transmission Control Protocol, MPTCP, capable wireless device, causes the MPTCP capable wireless device to perform the previously disclosed method.

The MPTCP proxy and the computer-readable storage medium each display advantages corresponding to advantages described for the corresponding methods and aspects of the methods.

DETAILED DESCRIPTION

Figure 1:
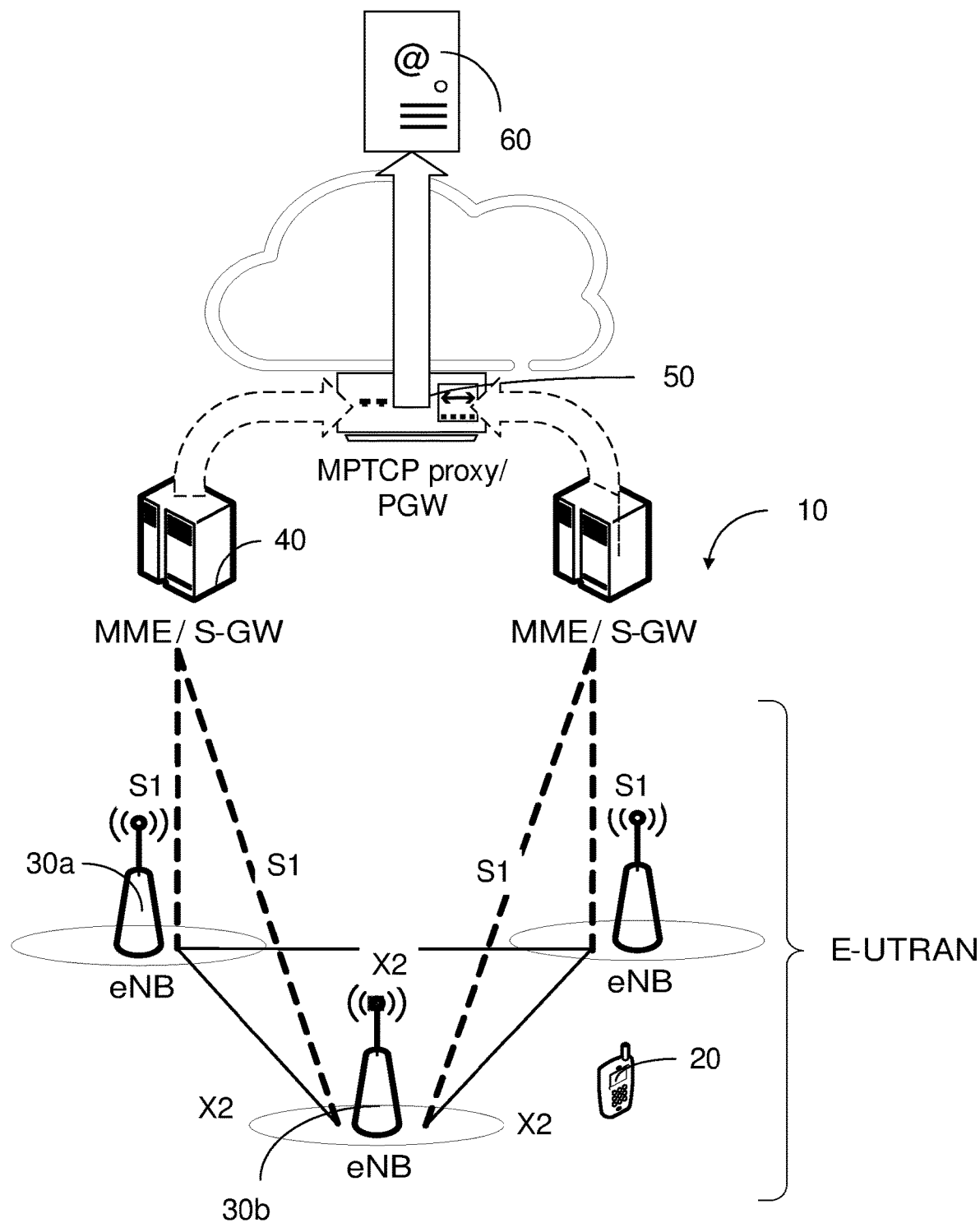
FIG. 1 schematically illustrates a cellular communication network
FIG. 2
a. illustrates a first scenario for MPTCP subflows
b. illustrates a scenario for aggregating MPTCP subflows in an MPTCP proxy
c. illustrates another MPTCP proxy scenario

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. It should be appreciated that all of the example embodiments presented herein may be applicable to cellular network.

In a MPTCP scenario, applied for an LTE-only scenario, an MPTCP main flow and one or more MPTCP subflows are transported on different bearers, e.g. on first network paths based on default bearers and second network paths based on dedicated bearers.

In prior art solutions for providing different subflows on different bearers, a wireless device is associated with LTE PDN-connections having their own IP-addresses, e.g. IP-1 and IP-2, and providing the different bearers as each PDN connection has at least a default bearer. As each PDN-connection has a first network path it will all work as long as the MPTCP main flow is using IP-1 as the UE-side address and IP-2 as the UE-side address for the MPTCP subflow.

Another situation that requires a different solution is when there is only one LTE-PDN connection to a MPTCP capable wireless device, i.e. a single IP address. A prior art solution for such a scenario comprises using different TCP ports for the different bearers i.e. MPTCP main flows and subflows e.g. on separate TCP-port ranges and mapped to the different bearers based on the TCP-port ranges. This represents a working solution but would also require agreement of the port ranges in e.g. a standard.

Thus, there is a need for further solutions to support MPTCP on a wireless device associated with one LTE PDN connection, e.g. a specific LTE PDN connection or a single PDN connection for the wireless device usable for both LTE and Wi-Fi but here associated to an LTE PDN connection. The single PDN connection is also a concept known from an IP Flow Mobility, IFOM, case wherein routing rules define which traffic on the IFOM PDN connection that is to be sent as LTE traffic and which is to be sent as Wi-Fi/WLAN traffic.

The disclosure provides mechanisms for supporting single IP aggregation of multiple network paths and to enable splitting of MPTCP data on multiple paths to support aggregation of multiple network paths with MPTCP. A basic concept involves aggregation of multiple network paths with MPTCP in case of a single IP address for the wireless device PDN connection. Examples of such single IP address cases comprise connectivity within one 3GPP radio access technology, RAT, traffic aggregation involving two or more 3GPP RATs, traffic aggregation involving 3GPP RAT and Wi-Fi, and connectivity within the above discussed IFOM case. One example of the connectivity within one 3GPP radio access technology are solutions based on the LTE Dual Connectivity and LTE Carrier Aggregation in which the UE is able to use the resources of multiple frequency carriers simultaneously. In this case, MPTCP can be used between these frequency carriers as long as the MPTCP main flow and subflow(s) are mapped to different bearers, and the RAN logic for LTE Dual Connectivity or LTE Carrier Aggregation ensures that these different bearers are steered to different frequency carriers.

This disclosure presents arrangements for multipath traffic aggregation using a multipath Transmission Control Protocol, MPTCP, proxy.

FIG. 1 discloses an exemplary LTE wireless network 10. A wireless device, in the following also presented as a user equipment, UE, 20 is arranged for data transmission over an air interface to one or more base stations 30a and b, here illustrated as eNBs. The MME/S-GW 40 represents known control and user plane core network entities enabling data connections to a server 60 over the internet through an MPTCP proxy 50. The MPTCP proxy 50 is shown in FIG. 1 as co-located with the PGW and this is just one exemplary arrangement. For example, in another case the MPTCP proxy 50 may be placed on the SGi interface outside the PGW. For any UE 20 with MPTCP capability within a mobile network, an operator or service provider can enable MPTCP for the UE for TCP service by adding a MPTCP-proxy in the network. It is a task of the MPTCP-proxy to convert regular TCP protocol from server, to MPTCP protocol towards UE, and vice versa, where multipath is possible when e.g. dual connectivity is available. Using MPTCP it is possible to increase the total throughput of TCP traffic.

Figure 2A:
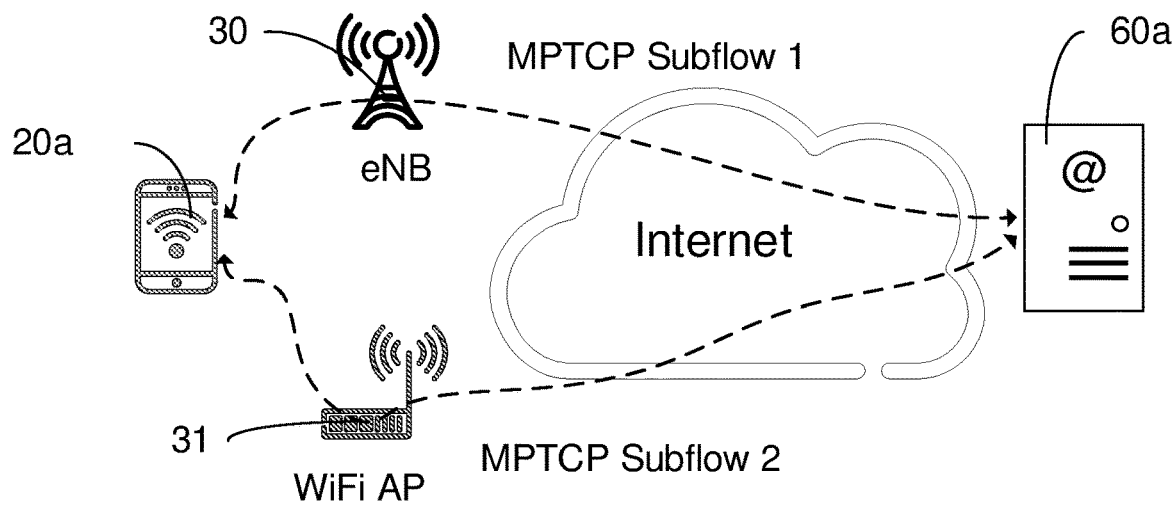

FIG. 2a discloses a MPTCP connection where the UE is associated with two PDN-connections, here illustrated as a first PDN-connection over LTE RAN and a second PDN-connection by means of Wi-Fi. The second PDN connection over Wi-Fi may also be any IP-connection, i.e. not necessarily a PDN-connection anchored in the PGW. In the illustrated case, MPTCP connections are established between the MPTCP enabled wireless device 20a and an MPTCP enabled Internet server 60a. The MPTCP capable wireless device is associated with two PDN-connections used in the MPTCP connection from the MPTCP enabled wireless device 20a to the MPTCP enabled Internet server 60a. Here the MPTCP connection to the server includes a first subflow, MPTCP Subflow-1 and a second subflow, MPTCP Subflow-2. MPTCP Subflow-1 is set up over a 3GPP access network, here illustrated as an eNodeB 30. MPTCP Subflow-2 is set up over a Wi-Fi network, here illustrated by a router 31 (e.g. a Wi-Fi access point). The multipath connection is used all the way between MPTCP enabled wireless device 20a and the MPTCP enabled Internet server 25a.

Figure 2B:
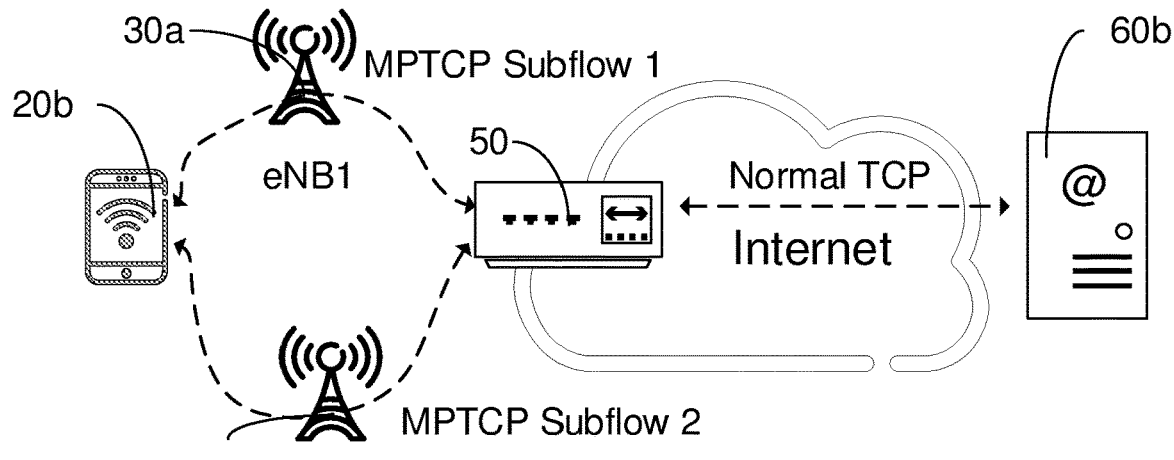

FIG. 2b discloses the situation when there is no support for MPTCP in the Internet server 60b representing the destination node. The disclosed MPTCP enabled wireless device 20b is either an MPTCP device associated to a single PDN-connection or an MPTCP device associated to a multiple PDN-connections. In this case an MPTCP proxy 50 is introduced in the network and represents a destination node of an MPTCP connection with the wireless device; with MPTCP subflows 1 and 2 toward the wireless device 20b via eNB1 30a and eNB2 30b. The MPTCP proxy 50 is configured as a separate entity in the wireless communications network, part of a PDN-GW in the wireless network or any other suitable entity in the network or as a standalone entity. The MPTCP proxy 50 relays data to the Internet server 60b node using a normal TCP connection. The wireless device 20b may be connected to the eNB1 30a and eNB2 30b using for example LTE Dual Connectivity or LTE Carrier Aggregation.

Figure 2C:
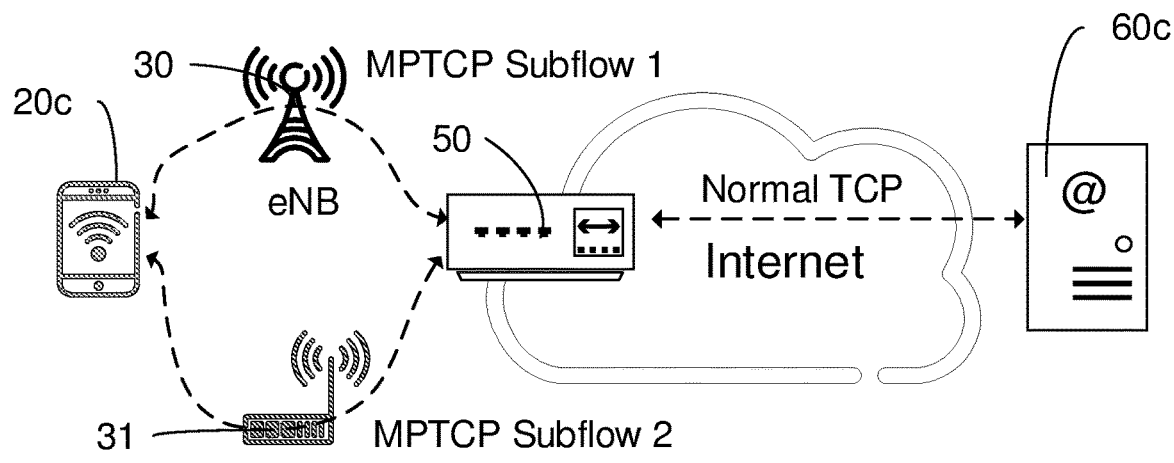

FIG. 2c also discloses a scenario where the MPTCP connections from a MPTCP capable device are set up to an MPTCP proxy 50. In the disclosed scenario, a first subflow is transmitted on an LTE bearer, while a second subflow is sent as Wi-Fi traffic. The disclosed MPTCP enabled wireless device 20c is either an MPTCP device associated to a single PDN-connection, such as a device having an IFOM PDN-connection, or an MPTCP device associated to a multiple PDN-connections.

In the following presentation, it is assumed that the MPTCP capable wireless device is associated to fewer PDN-connections than what would be required to benefit from the full MPTCP capability of the wireless device, e.g. that the wireless device is associated with a single PDN-connection. It is further assumed that an MPTCP proxy relays data back and forth to an Internet server on a TCP connection.

Figure 3:
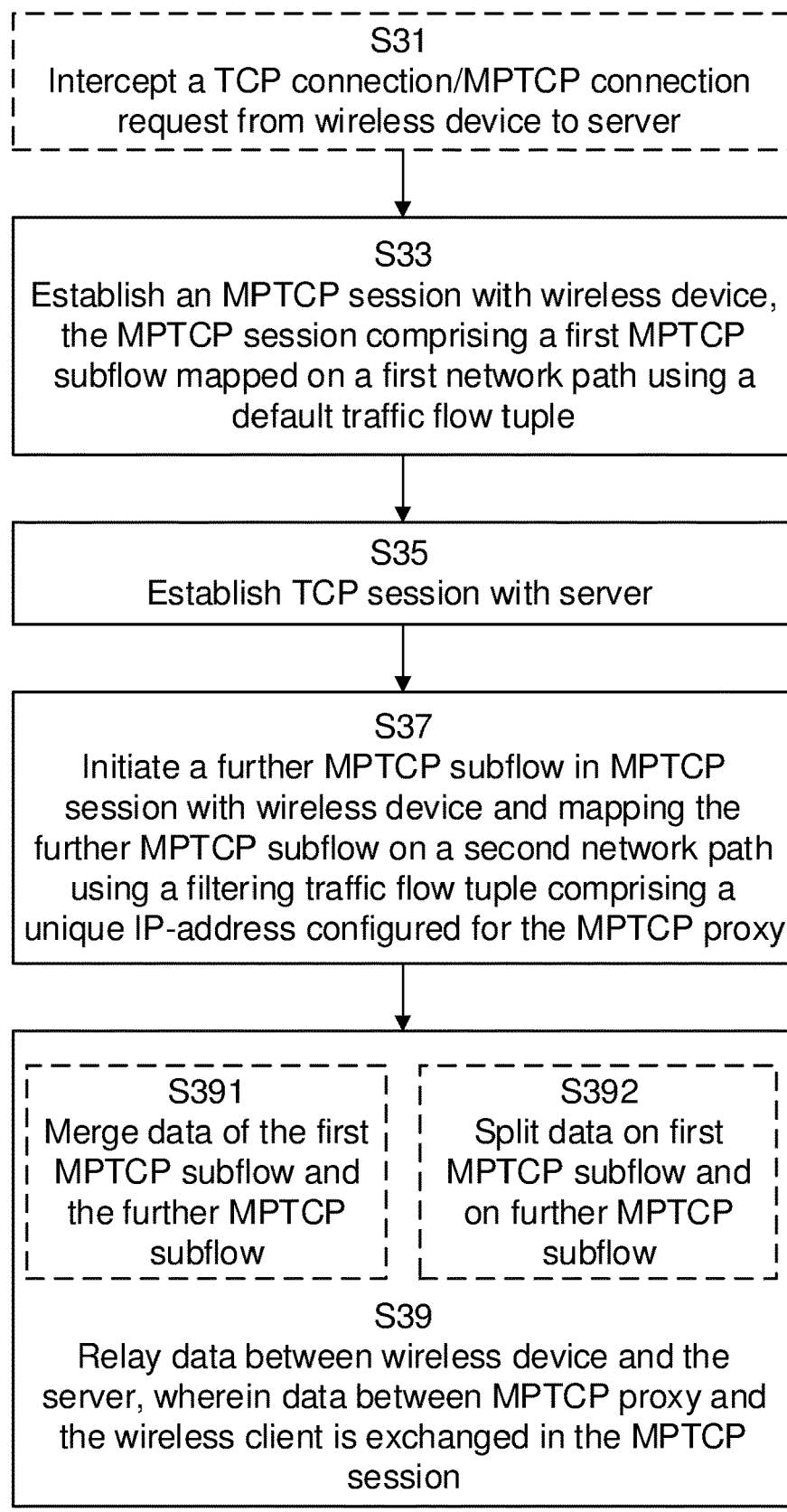
FIG. 3 is a flowchart schematically illustrating embodiments of method steps performed in an MPTCP proxy

FIG. 3 is a flowchart illustrating example operations performed in such a multipath Transmission Control Protocol, MPTCP, proxy. According to the present disclosure, the MPTCP proxy is configured with one or more unique Internet Protocol, IP, addresses; the one or more unique IP addresses being specific for the MPTCP proxy. In the following exemplifying disclosure, it will be assumed that the MPTCP proxy is configured with one IP address, but it should be realized that the disclosed principles are also applicable when the MPTCP proxy is associated with more than one IP-address allowing for additional MPTCP subflows to/from the MPTCP proxy in accordance with the principles disclosed below. The MPTCP proxy is arranged to relay between an MPTCP capable wireless device and a server.

In its broadest context, the disclosed method of relaying data between an MPTCP capable wireless device and a server comprises establishing S33 an MPTCP session between the MPTCP proxy and the wireless device, the MPTCP session comprising a first MPTCP subflow mapped on a first network path for the wireless device using a default traffic flow tuple and establishing S35 a TCP session with the server. The MPTCP server performs the operation of initiating S37 a further MPTCP subflow in the MPTCP session between the MPTCP proxy and the wireless device based on a mapping of the further MPTCP subflow to a second network path for the wireless device using a filtering traffic flow tuple comprising the unique IP-address configured for the MPTCP proxy. The operation of relaying S39 data between the wireless device and the server comprises exchanging data between the MPTCP proxy and the wireless device in the MPTCP session comprising the first MPTCP subflow on the first network path and the further MPTCP subflow on the second network path and exchanging data between the MPTCP proxy and the server is exchanged in the TCP session.

According to aspects of the disclosure, the relaying of traffic is initiated upon intercepting S31 in the MPTCP proxy a Traffic Control Protocol, TCP, connection request or an MPTCP connection request from the wireless device to a server and determining that the wireless device is a multipath and MPTCP capable wireless device. A second network path is established, e.g. through a static configuration wherein both a default and dedicated bearer are created when the UE attaches to the network or through signalling from the MPTCP proxy. In the latter case, the MPTCP proxy signals to a Policy and Charging Rules Function, PCRF, with information about the additional unique IP-address configured for the MPTCP proxy. The PCRF then triggers the establishment of the dedicated bearer via the PGW/PDN- GW. Another aspect of the disclosure involves verifying establishment of the second network path.

The MPTCP proxy relays data between the wireless device and the server. The proxy can be configured as a fully transparent proxy that the wireless device is incapable of perceiving. The proxy can also be configured as an explicit proxy visible to the wireless device with its own IP address. This explicit proxy case then means that an initial address is used for the MPTCP proxy and that the UE connects to the initial address. After initiating the connection, the further MPTCP subflow is set up using the additional unique IP-address. The operation of relaying data between the wireless device and the server comprises relaying both in an uplink and in a downlink direction. According to aspects of the disclosure, the operation of relaying data comprises merging 5391 data received in the first MPTCP subflow and the further MPTCP subflow to the TCP flow when delivering the data uplink to the receiving server. When relaying data in the opposite direction, downlink from the server to the wireless device, the relaying operation comprises splitting 5392 data received in the TCP flow to the first MPTCP subflow and the further MPTCP subflow.

As mentioned, at least one IP-address is assigned to the MPTCP proxy so that the proxy is associated with its own unique IP-address. This unique IP-address is used in operation S37 to establish a further MPTCP subflow between the MPTCP proxy and an MPTCP capable wireless device, once a main subflow has been established using the IP-address associated to a PDN-connection of the MPTCP capable wireless device. Thus, the further subflow and the IP-address of the MPTCP proxy is used for establishing an additional MPTCP subflow after the first main MPTCP subflow is established between UE and server through the MPTCP-proxy. This additional MPTCP subflow can be initiated by either the UE or the MPTCP-proxy, as will be explained further with reference to FIGS. 7a and b. When the operation of setting up the MPTCP subflows is entrusted to the MPTCP capable wireless device, the step of initiating S37 the at least one further TCP subflow comprises sending information on the IP address configured for the MPTCP proxy to the wireless device. For a static configuration case, the According to an aspect of the disclosure, the relaying of data is performed for an MPTCP capable wireless device comprising a communication interface having a single IP address. Examples of communication interfaces where the method is applicable are a 3GPP RAN interface or an IFOM interface each associated with a single PDN-connection. However, the disclosure is also possible for other current and future scenarios involving MPTCP connections to/from a wireless device.

According to aspects of the disclosure, the first network path and second network path are at least partly based on respective radio bearers, e.g. on a default radio bearer and a dedicated radio bearer or on two dedicated radio bearers. Traffic with IP address associated to the PDN connection of the wireless device is run on the first network path. Traffic with the additional unique MPTCP-proxy IP address is run on the second network path. The second network path for the additional unique MPTCP proxy IP-address can either be statically configured, or by using Rx-based signalling from MPTCP-proxy through a Policy and Charging Rules Function, PCRF. One example of the static configuration is that both the first and second network paths are established when the UE attaches to the network. A default bearer is created for the first network path and a dedicated bearer is created for the second network path. The dedicated bearer has a TFT related to the additional unique IP-address of the MPTCP proxy. In the Rx-based signalling variant, the MPTCP proxy signals to the PCRF with information about the additional unique MPTCP proxy IP-address together with an identifier for the wireless device. The PCRF then triggers the establishment of the dedicated bearer for the second network path via the PGW/PDN-GW.

A bearer carries traffic in the form of IP packets. Which traffic is carried on a bearer is defined by filters. A filter is an n-tuple where each element in the tuple contains a value, a range, or a wildcard. An n-tuple is also known as an IP flow. An example of a traffic flow tuple is (dst IP=83.50.20.110, src IP=145.45.68.201, dst port=80, src port=*, port=TCP). This 5-tuple defines a source and destination IP address, a source and destination port, and a protocol. The source port is a wildcard. Traffic matching this 5-tuple filter would be all TCP traffic from IP=145.45.68.201 to IP=83.50.20.110 and port=80.

According to an aspect of the disclosure, the communication interface is a 3GPP LTE radio interface for an LTE PDN connection and the traffic flow tuple is a Traffic Flow Template, TFT. In 3GPP LTE, steering of different MPTCP subflows to different radio bearers, e.g. to a default radio bearer or a dedicated radio bearer, is done by the traffic flow templates, TFTs. According to an aspect of the disclosure, the default radio bearer is a Master Cell Group, MCG, bearer and the dedicated radio bearer is Secondary Cell Group, SCG, bearer used in the LTE Dual Connectivity case.

A traffic flow template, TFT, contains one or more filters. Every bearer has a TFT. One bearer within a PDN connection and access may lack an explicit TFT. This bearer is typically the default bearer used for the first network path. Implicitly such bearer has a TFT with a single filter matching all packets, i.e. a default traffic flow tuple.

The TFT for each bearer exists both in the PDN Gateway, PGW and in the wireless device. The PGW does the mapping of IP flows into specific bearers in the downlink, and the wireless device performs similar actions for the uplink direction. The following TFTs will be created in both the PGW and in the wireless device (in the case of static configuration) during setup of radio bearers when the UE attaches to the network:

First network path=first bearer=default bearer (this is case of a TFT with a single filter matching all packets)
  (network/proxy side)—source IP: any, destination IP: any (or <UE PDN context IP address>), source port: any, destination port: any, Protocol: any
  (UE side)—source IP: any (or <UE PDN context IP address>), destination IP: any, source port: any, destination port: any, Protocol: any
Second network path=second bearer=dedicated bearer
  (network/proxy side)—source IP: <additional unique MPTCP proxy IP-address>, destination IP: <UE PDN context IP address>, source port: any, destination port: any, Protocol
  (UE side)—source IP: <UE PDN context IP address>, destination IP: <additional unique MPTCP proxy IP-address>, source port: any, destination port: any, Protocol The TFT for the second network path can also be created form the MPTCP proxy using the Rx-interface. One example is that the MPTCP proxy triggers the creation of the second network path when it establishes the MPTCP session to the wireless device on the first network path.

In a 3GPP LTE scenario where the PDN connection is established to an LTE RAN, the first network path is at least partly based on a first bearer, e.g. a default bearer associated to the IP address of the wireless device. The second network path is at least partly based on a second bearer, e.g. a dedicated bearer capable of filtering TCP packets on an MPTCP subflow to/from the wireless device using the additional unique IP-address of the MPTCP proxy.

During network setup, one additional unique IP-address is allocated for the MPTCP-proxy. This allocation is for example done manually during network planning. The additional unique MPTCP-proxy IP address is only to be used for additional MPTCP subflows (i.e. it is never used for MPTCP mainflows). For the static configuration case, information about the additional unique MPTCP proxy IP-address may also be configured in the PCRF.

According to an aspect of the disclosure, the communication interface is an IP Flow Mobility, IFOM, interface for an IFOM PDN connection and wherein routing rules define which traffic on the IFOM PDN connection that is to be sent using an LTE access and which is to be sent using a Wi-Fi/WLAN access. In an IFOM scenario the first and second network paths are defined as the above disclosed radio bearers when using an LTE access. When using a Wi-Fi access, the first and second network paths are set up according to Wi-Fi standard.

The above disclosed operations are also applicable to a scenario where the MPTCP proxy is configured with a least one additional unique IP-address, e.g. that the IP addresses of the MPTCP proxy are IP-I and IP-II. The operation of establishing an additional subflow is then performed for each IP-address for the MPTCP proxy, repeating the procedure of establishing a subflow for IP-address IP-I, when setting up an additional subflow using an additional IP-address IP-II over an additional network path. The additional MPTCP subflow is between the wireless device and the MPTCP proxy using an additional filtering traffic flow tuple, e.g. a dedicated TFT, comprising the additional unique IP-address of the MPTCP proxy. The disclosed principles are also applicable to a scenario where the MPTCP proxy is associated with one unique IP-address, and a plurality of unique ports for enabling additional subflows. In such a scenario, the MPTCP proxy is associated with the same unique IP-address, but a plurality of unique ports allowing for additional MPTCP subflows to/from the MPTCP proxy in accordance with the above discussed principles. The operations performed in the proxy or as disclosed below, in an MPTCP capable wireless device, are repeated for each port.

The following cases exemplify the situation of setting up additional subflows for the different cases with a transparent MPTCP proxy and a non-transparent MPTCP proxy.

Transparent MPTCP Proxy

Setting up a first MPTCP subflow: use a Traffic Flow Template, TFT, with the server and UE IP address (no IP address/port on MPTCP proxy is involved)

Setting up the second MPTCP subflow: use a TFT with the additional MPTCP proxy IP address and UE IP address, or a dedicated TFT with the additional MPTCP proxy IP address and an MPTCP unique port number, and UE IP address.

Setting up a third, fourth, . . . MPTCP subflow: use TFT:s with 2nd, 3rd, . . . MPTCP proxy IP addresses and the UE IP address, or use dedicated TFT:s with the additional MPTCP proxy IP address+2nd, 3rd, . . . port number, and UE IP address.

Non-Transparent MPTCP Proxy

Setting up the first MPTCP subflow: use TFT with the MPTCP proxy IP address+port number, and UE IP address (the server IP address is located in the proxy protocol).

Setting up the second MPTCP subflow: use TFT with the additional MPTCP proxy IP address and UE IP address, or use TFT with the MPTCP proxy IP address+2nd port number, and UE IP address.

Setting up the third, fourth, . . . MPTCP subflow: use TFT with 2nd, 3rd, . . . MPTCP proxy IP address and the UE IP address, or use TFT with the MPTCP proxy IP address+3rd, 4th, . . . port number, and UE IP address.

Figure 4:
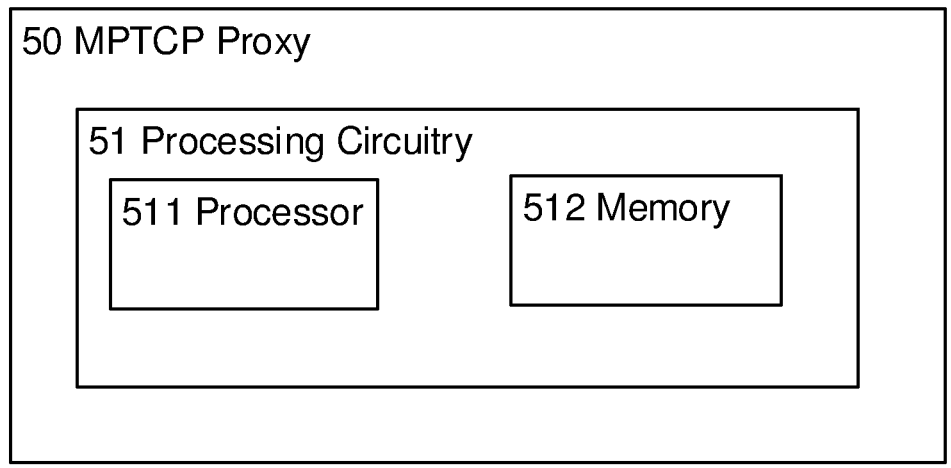
FIG. 4 is a block diagram of an MPTCP proxy

FIG. 4 illustrates an example MPTCP proxy 50, e.g. the proxy illustrated in FIGS. 1 and 2a-2c for performing the previously discussed operations. The MPTCP proxy 50 comprises processing circuitry 51 operative to relay data between a multipath Transmission Control Protocol, MPTCP, capable wireless device and a server.

The processing circuitry 50 is configured to perform the example operations illustrated in FIG. 3. When executing the example operations, the processing circuitry is adapted to establish a multipath Transmission Control Protocol, MPTCP, session between the MPTCP proxy and the wireless device, the MPTCP session comprising a first MPTCP subflow mapped on a first network path for the wireless device using a default traffic flow tuple and to establish a TCP session with the server. The MPTCP proxy is further adapted to initiate a further MPTCP subflow in the MPTCP session between the MPTCP proxy and the wireless device based on a mapping of the further MPTCP subflow to a second network path for the wireless device using a filtering traffic flow tuple comprising the unique IP-address configured for the MPTCP proxy and to relay data between the wireless device and the server, wherein data between the MPTCP proxy and the wireless device is exchanged in the MPTCP session comprising the first MPTCP subflow on the first network path and the further MPTCP subflow on the second network path and wherein data between the MPTCP proxy and the server is exchanged in the TCP session.

In an example embodiment, the processing circuitry 51 comprises a processor 511 and a memory 512 configured to store a computer program, which when run in the processor causes the network node to perform the antenna sector configuration selection.

Figure 5:
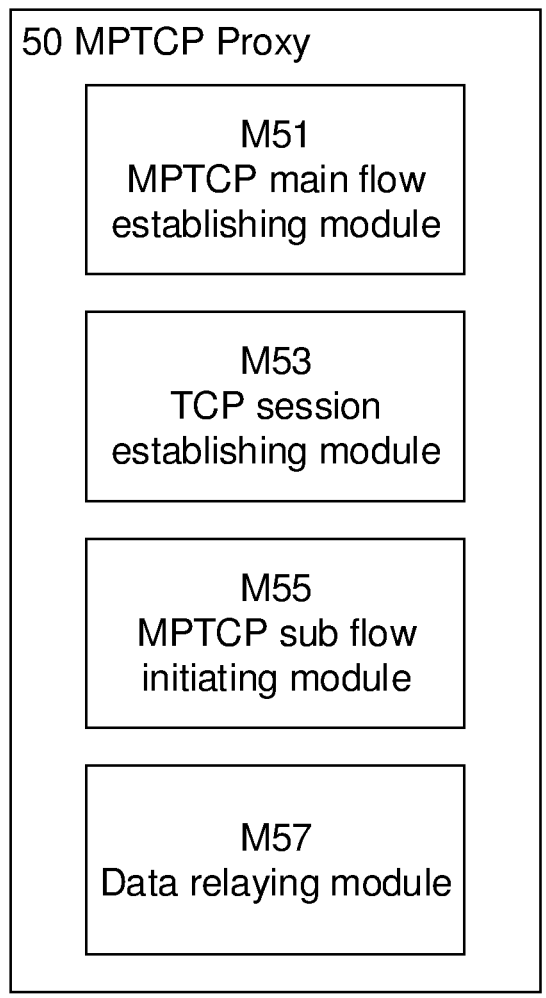
FIG. 5 is a block diagram illustrating modules in an MPTCP proxy

FIG. 5 discloses a different representation of the MPTCP proxy, configured with a unique IP address. The MPTCP proxy 50 comprises one or several of:

an MPTCP main flow establishing module M51 configured to establish a multipath Transmission Control Protocol, MPTCP, session between the MPTCP proxy and the wireless device, the MPTCP session comprising a first MPTCP subflow mapped on a first network path for the wireless device using a default traffic flow tuple;

a TCP session establishing module M53 configured to establish a TCP session with the server;

an MPTCP sub flow initiating module M55 configured to initiate a further MPTCP subflow in the MPTCP session between the MPTCP proxy and the wireless device based on a mapping of the further MPTCP subflow to a second network path for the wireless device using a filtering traffic flow tuple comprising the unique IP-address configured for the MPTCP proxy;

a data relaying module M57 configured to relay data between the wireless device and the server, wherein data between the MPTCP proxy and the wireless device is exchanged in the MPTCP session comprising the first MPTCP subflow on the first network path and the further MPTCP subflow on the second network path and wherein data between the MPTCP proxy and the server is exchanged in the TCP session.

According to the present disclosure, a MPTCP proxy is configured with one or more unique Internet Protocol, IP, addresses; the one or more unique IP addresses being specific for the MPTCP proxy. The MPTCP proxy is arranged to relay data between the MPTCP capable wireless device and a server.

In the following exemplifying disclosure, it will be assumed that the MPTCP proxy is configured with one IP address, but it should be realized that the disclosed principles are also applicable when the MPTCP proxy is associated with more than one IP-address allowing for additional MPTCP subflows to/from the MPTCP proxy in accordance with the principles disclosed below. In such a scenario, the below mentioned operations are repeated for each additional IP-address. The disclosed principles are also applicable to a scenario where the MPTCP proxy is associated with one unique IP-address, and a plurality of unique ports for enabling additional subflows. In such a scenario, the MPTCP proxy is associated with the same unique IP-address, but a plurality of unique ports allowing for additional MPTCP subflows to/from the MPTCP proxy in accordance with the above discussed principles. The operations performed in the proxy or as disclosed below, in an MPTCP capable wireless device, are repeated for each port.

Figure 6:
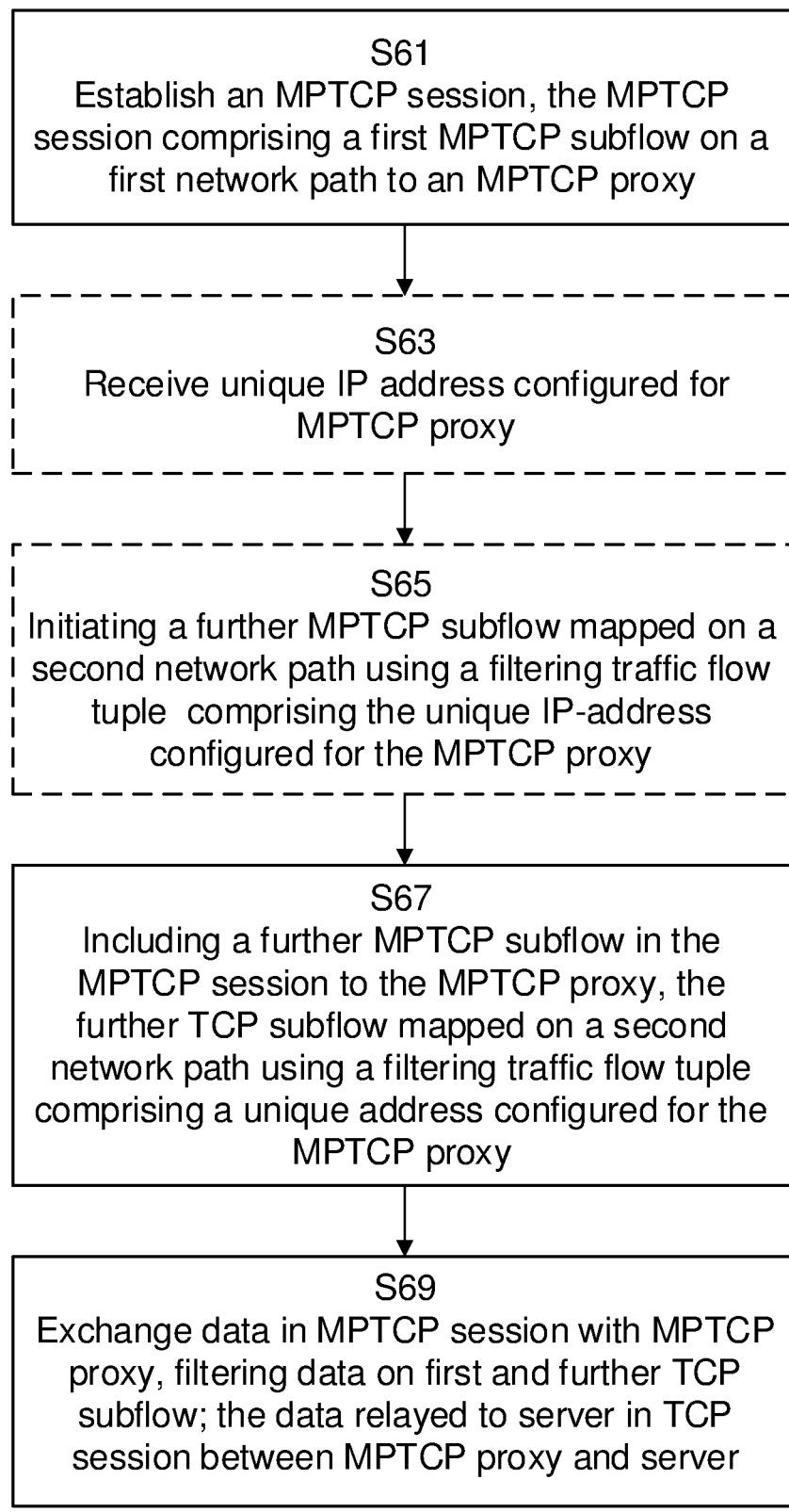
FIG. 6 is a flowchart schematically illustrating embodiments of method steps performed in a wireless device.

FIG. 6 is a flowchart illustrating example operations performed in an MPTCP capable wireless device for setting up a TCP data exchange with a server. The MPTCP capable wireless device has an associated PDN connection that is used for establishing the multipath connection. The disclosure is not limited to wireless devices configured with single IP-addresses per se. Advantageously, the method is used for an MPTCP capable wireless device comprising a communication interface having a single IP-address, i.e. for the situation where a single IP-address is to be used when establishing the multipath connection.

In its broadest context, the disclosed method of setting up a data exchange between an MPTCP capable wireless device and a server comprises establishing S61 a multipath TCP, MPTCP, session to an MPTCP proxy that is configured to intercept a TCP connection request or an MPTCP connection request from the wireless device to a server; the MPTCP session comprising a first MPTCP subflow mapped on a first network path using a first traffic flow tuple. The disclosed method also comprises the operation of including S67 a further MPTCP subflow in the MPTCP session to the MPTCP proxy, the further TCP subflow mapped on a second network path using a filtering traffic flow tuple comprising a unique IP-address configured for the MPTCP proxy. When the multipath connection comprising a first MPTCP subflow and a further MPTCP subflow has been established, the disclosed method comprises exchanging S69 data in MPTCP session with the MPTCP proxy, filtering data on the first TCP subflow on the first network path and on the further TCP subflow on the second network path; the data being relayed to the server in a TCP flow in a TCP session between the MPTCP proxy and the server.

As mentioned previously, the further MPTCP subflow can be initiated by either the UE or the MPTCP-proxy. When the operation of setting up the MPTCP subflows is entrusted to the MPTCP capable wireless device, operations performed in the wireless device for initiating the at least one further TCP subflow comprises sending information on the IP address configured for the MPTCP proxy to the wireless device. When the setting up of the further MPTCP subflows is performed in the MPTCP capable wireless device, exemplary operations performed in this device also comprises an operation of receiving S63 information on the unique IP address configured for MPTCP proxy and a further operation of initiating S65 a further MPTCP subflow between the wireless device and the MPTCP proxy based on a mapping of the further TCP subflow to a second network path using a filtering traffic flow tuple comprising the unique IP-address configured for the MPTCP proxy.

According to aspects of the disclosure, the MPTCP capable wireless device is a 3GPP LTE wireless devices having a 3GPP LTE radio interface for an LTE PDN connection and the traffic flow tuple is a Traffic Flow Template, TFT or an IFOM, interface for an IFOM PDN connection. Routing rules for the IFOM communication interface define which traffic on the IFOM PDN connection that is to be sent using an LTE PDN connection and which is to be sent using a Wi-Fi/WLAN PDN connection.

The above mentioned operations are repeated for each additional unique IP-address configured for the MPTCP proxy using an additional filtering traffic flow tuple comprising the additional unique IP-address of the MPTCP proxy. An additional MPTCP subflow may also be initiated using a unique port number of a MPTCP port, in a filtering traffic flow tuple using the previously discussed additional unique MPTCP proxy IP-address, i.e. distinguishing traffic on different subflows using a port number of the MPTCP.

Figure 7:
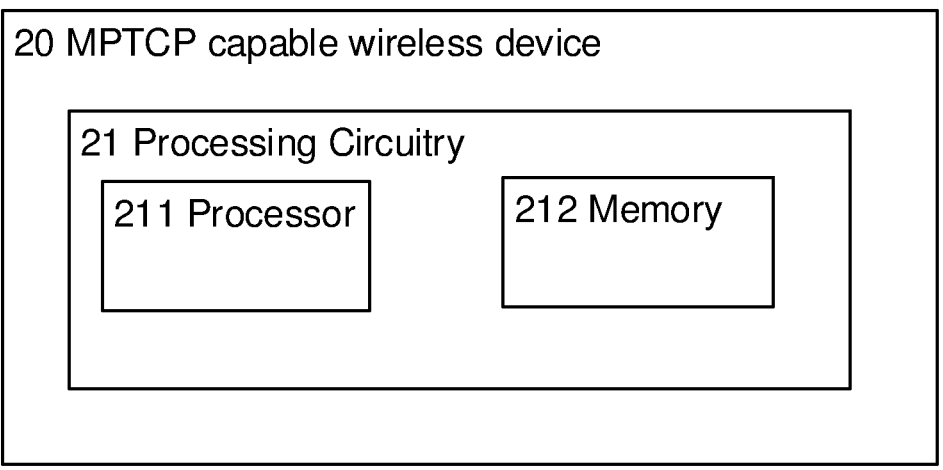
FIG. 7 is a block diagram of an MPTCP capable wireless device

FIG. 7 illustrates an exemplary MPTCP capable wireless device 20, e.g. an MTPCP capable wireless device, corresponding to the wireless device 20 or 20a-c of FIGS. 1 and 2a-2c, for performing the previously discussed operations. The MPTCP capable wireless device 20 comprises processing circuitry 21 operative to exchange data over a TCP connection with a server.

The processing circuitry 21 is configured to perform the example operations illustrated in FIG. 7. When executing the example operations, the processing circuitry is adapted to establish a multipath TCP, MPTCP, session to an MPTCP proxy configured to intercept a TCP connection request or an MPTCP connection request from the wireless device to a server, the MPTCP session comprising a first MPTCP subflow mapped on a first network path using a default traffic flow tuple. The processing circuitry is further adapted to include a further MPTCP subflow in the MPTCP session to the MPTCP proxy, the further TCP subflow mapped on a second network path using a filtering traffic flow tuple comprising a unique IP-address configured for the MPTCP proxy. Data is exchanged in an MPTCP session with the MPTCP proxy, filtering data on the first TCP subflow on the first network path and on the further TCP subflow on the second network path; the data being relayed to the server in a TCP flow in a TCP session between the MPTCP proxy and the server.

In an example embodiment, the processing circuitry 21 comprises a processor 211 and a memory 212 configured to store a computer program, which when run in the processor causes the network node to perform the antenna sector configuration selection.

Figure 8:
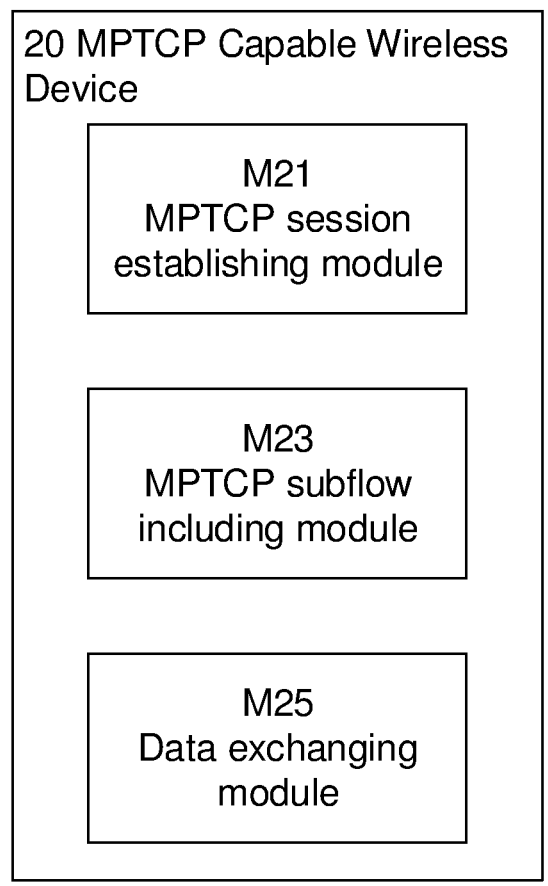
FIG. 8 is a block diagram illustrating modules in an MPTCP capable wireless device
FIG. 9
a. is a signalling diagram for establishing an MPTCP connection
b. is a signalling diagram for alternative option for establishing an MPTCP connection.

FIG. 8 discloses a different representation of the MPTCP capable wireless device 20. The MPTCP capable wireless device comprises one or several of:
an MPTCP session establishing module M21 configured to establish a multipath TCP, MPTCP, session to an MPTCP proxy configured to intercept a TCP connection request or an MPTCP connection request from the wireless device to a server, the MPTCP session comprising a first MPTCP subflow mapped on a first network path using a default traffic flow tuple;

an MPTCP subflow including module M23 configured to include a further MPTCP subflow in the MPTCP session to the MPTCP proxy, the further TCP subflow mapped on a second network path using a filtering traffic flow tuple comprising a unique IP-address configured for the MPTCP proxy;

a data exchanging module M25 configured to exchange data in an MPTCP session with the MPTCP proxy, filtering data on the first TCP subflow on the first network path and on the further TCP subflow on the second network path; the data being relayed to the server in a TCP flow in a TCP session between the MPTCP proxy and the server.

Figure 9A:
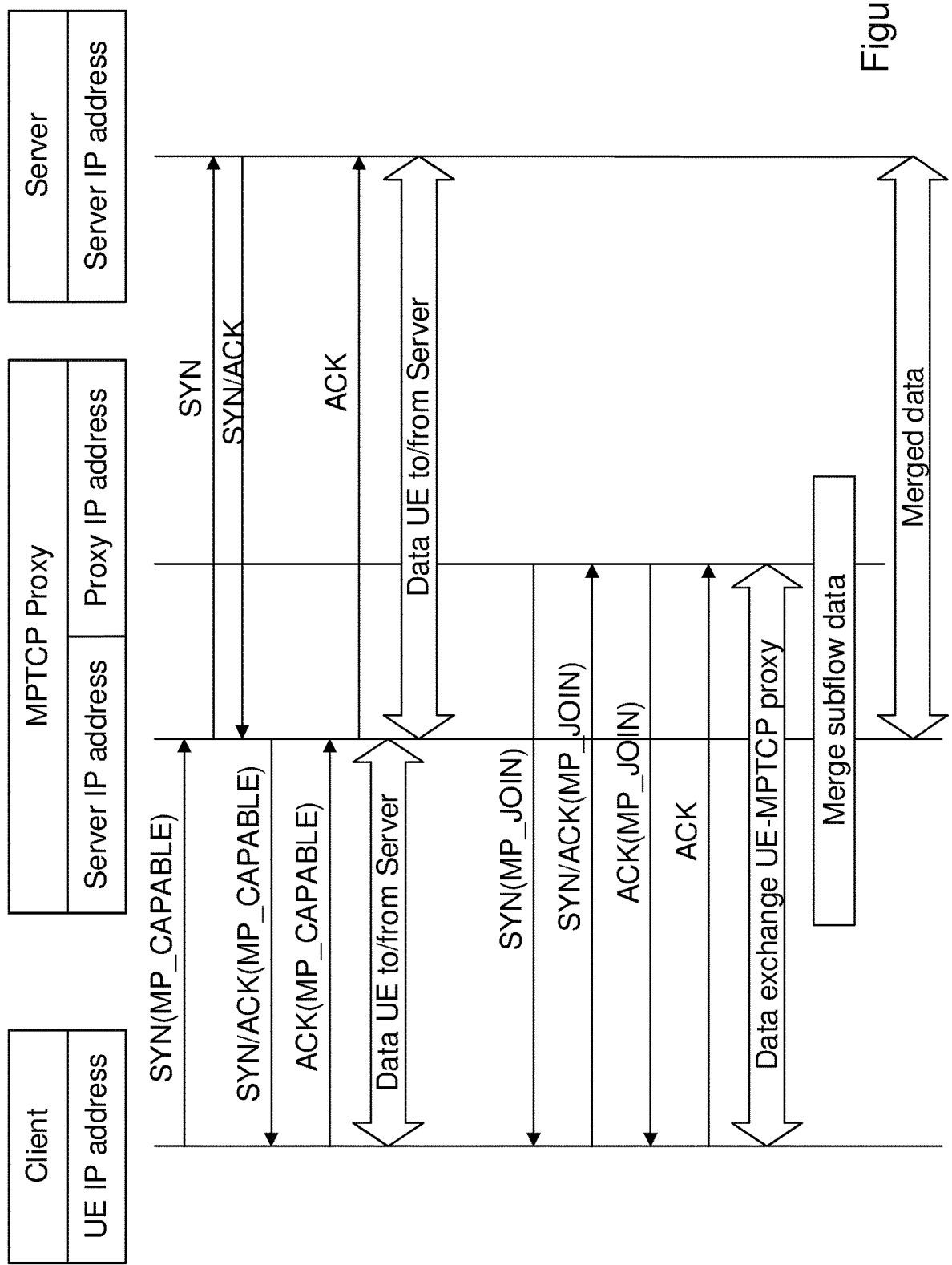
Figure 9B:
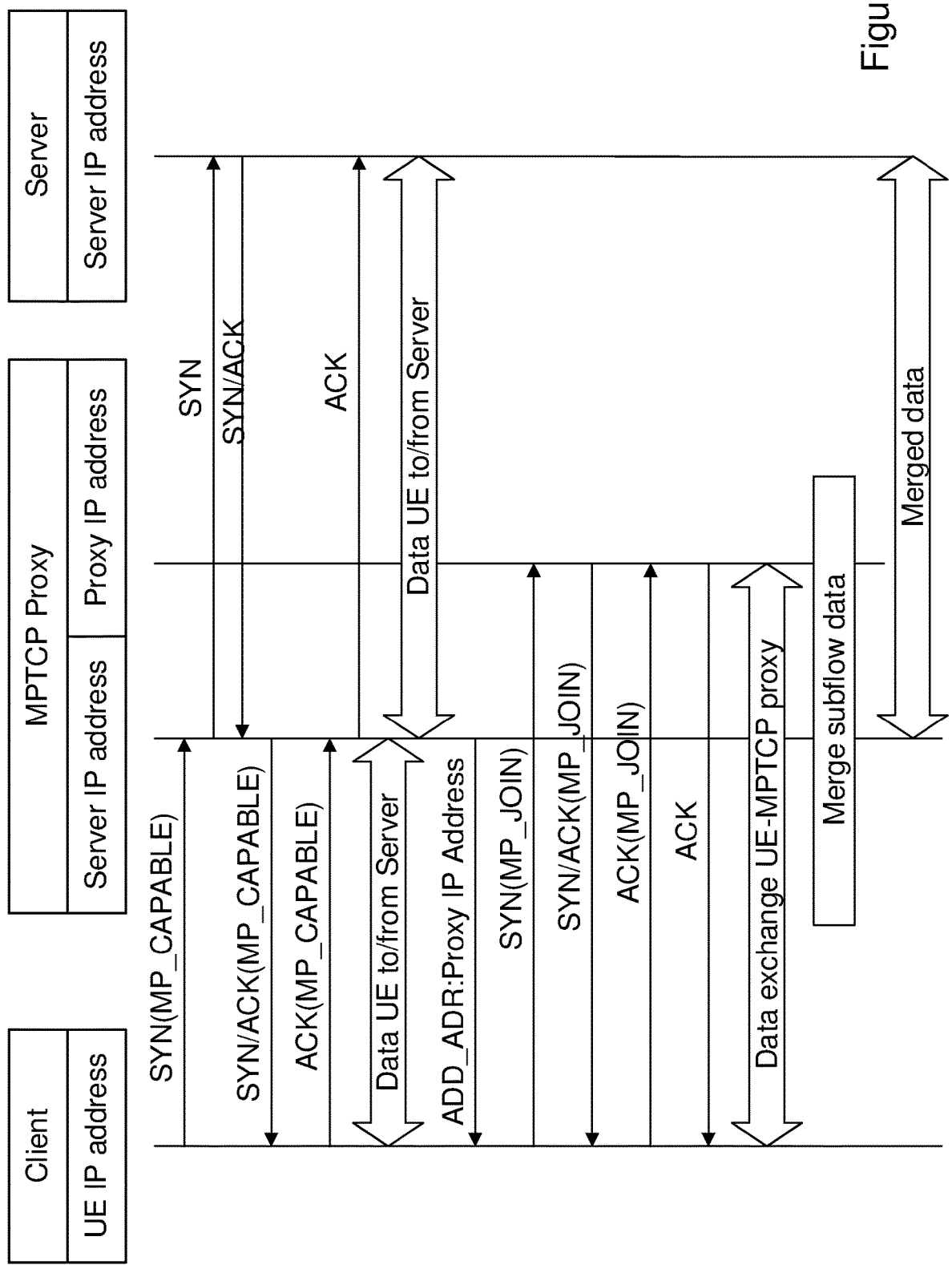

FIGS. 9a and 9b discloses signalling performed when establishing an MPTCP session between an MPTCP proxy configured with its own unique IP address and a single PDN connection associated with a MPTCP capable wireless device. The MPTCP connection establishment involves a three-way handshake. In the disclosed option for the MPTCP establishment process, the single IP-address wireless device includes an MPTCP indication in the three way handshake that is used to establish a first connection between the wireless device and a server. The MPTCP proxy intercepts a SYN (synchronization) message sent from the wireless device toward the server from. When establishing an MPTCP connection, the first SYN message includes information on an MP_CAPABLE option which informs the intercepting MPTCP that the single IP-address source node supports MPTCP. Thus, the wireless device establishes an MPTCP session (first/main subflow) with any server (MP_CAPABLE), the session being mapped to an MCG (default) bearer according to the TFT. The MPTCP proxy terminates the MPTCP session establishment and relays the access to server with regular TCP, preserving the IP addresses from server and UE. The MPTCP proxy responds with an acknowledgement of the synchronization message in a SYN/ACK message. As the MPTCP proxy also supports MPTCP, the response includes information on an MP_CAPABLE option. The connection is finalized when the destination node receives an acknowledgement from the single IP-address MPTCP capable wireless device in an ACK. In this ACK, the MPTCP capable wireless device could also include the MP_CAPABLE option. A first subflow of an MPTCP connection/session is then established between the MPTCP capable wireless device and the MPTCP proxy.

In order to arrive at an MPTCP connection/session, one or more additional subflows should be added to the established connection. FIG. 9a discloses the scenario where the MPTCP proxy initiates the additional MPTCP subflow. The MPTCP proxy sends a SYN (synchronization) message to the MPTCP capable wireless device. The MPTCP proxy can initiate a new MPTCP subflow SYN(MP_JOIN) using its new additional unique IP-address as source address. This subflow will be mapped to SCG (dedicated) bearer according to the TFTs configured in the PGW and in the MPTCP capable wireless device. This additional subflow will be associated with the first subflow using token and Hash Message Authentication Code, HMAC, as normally in MPTCP. The wireless device responds with an acknowledgement of the synchronization message in a SYN/ACK message. An ACK message acknowledging that the connection represents and additional MPTCP subflow is sent to the MPTCP proxy, indicating that the additional subflow is a subflow on the initiated MPTCP session. The connection is finalized when the MPTCP proxy receives an acknowledgement from the single IP-address MPTCP capable wireless device in an ACK. The MPTCP-proxy will now first merge the data from the subflows and relay the data to server with regular TCP, using the preserved server and UE IP addresses. Thus, the establishment of an additional MPTCP subflow is performed using state of the art messaging, with the exception that initiation of the further subflow is made from the MPTCP proxy, wherein information on the additional unique MPTCP proxy IP-address is included in the SYN message to the MPTCP capable wireless device.

FIG. 9b, discloses a similar scenario to that of FIG. 9a. In this case, the MPTCP proxy submits an "ADD_ADDR" to the MPTCP capable wireless device providing the additional unique MPTCP proxy IP-address to the MPTCP wireless device, for allowing the MPTCP capable wireless device to establish the MPTCP subflow(s) toward the MPTCP proxy.

The invention claimed is:

1. A method, performed in a multipath Transmission Control Protocol (MPTCP) proxy configured with a unique Internet Protocol (IP) address, of relaying data between an MPTCP-capable wireless device and a server, wherein the MPTCP-capable wireless device comprises a communication interface having a single IP address, wherein the communication interface is a 3GPP LTE radio interface for an LTE Packet Data Network (PDN) connection and the traffic flow tuple is a Traffic Flow Template (TFT), the method comprising:

establishing an MPTCP session between the MPTCP proxy and the wireless device, the MPTCP session comprising a first MPTCP subflow mapped on a first network path for the wireless device using a default traffic flow tuple;

establishing a TCP session with the server;

initiating a further MPTCP sub-flow in the MPTCP session between the MPTCP proxy and the wireless device, based on a mapping of the further MPTCP subflow to a second network path for the wireless device using a filtering traffic flow tuple comprising the unique IP-address configured for the MPTCP proxy, wherein the step of initiating the further MPTCP subflow comprises sending information on the IP address configured for the MPTCP proxy to the wireless device; and relaying data between the wireless device and the server, wherein data between the MPTCP proxy and the wireless device is exchanged in the MPTCP session comprising the first MPTCP subflow on the first network path and the further MPTCP subflow on the second network path and wherein data between the MPTCP proxy and the server is exchanged in the TCP session.

2. The method of claim 1, further comprising:
intercepting a TCP connection request or an MPTCP connection request from the wireless device to a server and determining that the wireless device is a multipath capable wireless device.

3. The method of claim 1, wherein the step of initiating the further MPTCP subflow comprises activating the second network path via Receive(Rx)-based signaling from the MPTCP-proxy to a Policy and Charging Rules Function (PCRF) with information about the additional unique MPTCP proxy IP-address and a wireless device identifier.

4. The method of claim 1, wherein step of relaying data between the wireless device and server further comprises the steps of:
merging data received in the first MPTCP subflow and the further MPTCP subflow to the TCP flow; and splitting data received in the TCP flow to the first MPTCP subflow and the further MPTCP subflow.

5. The method of claim 1, wherein an additional MPTCP subflow is included in the MPTCP session between the wireless device and the MPTCP proxy on an additional network path using an additional filtering traffic flow tuple comprising an additional unique IP-address of the MPTCP proxy and unique port number of an MPTCP port.

6. The method of claim 1, wherein the communication interface is an IP Flow Mobility (IFOM) interface for an IFOM Packet Data Network (PDN) connection, and wherein routing rules define which traffic on the IFOM PDN connection that is to be sent using an LTE access and which is to be sent using a Wi-Fi/WLAN access.

7. A multipath Transmission Control Protocol (MPTCP) proxy comprising:
processing circuitry operative to relay data between a multipath Transmission Control Protocol (MPTCP)-capable wireless device and a server wherein the MPTCP-capable wireless device comprises a communication interface having a single IP address, wherein the communication interface is a 3GPP LTE radio interface for an LTE Packet Data Network (PDN) connection and the traffic flow tuple is a Traffic Flow Template (TFT), the processing circuitry being further configured to:
establish a multipath Transmission Control Protocol (MPTCP) session between the MPTCP proxy and the wireless device, the MPTCP session comprising a first MPTCP subflow mapped on a first network path for the wireless device using a default traffic flow tuple;
establish a TCP session with the server;
initiate a further MPTCP subflow in the MPTCP session between the MPTCP proxy and the wireless device based on a mapping of the further MPTCP subflow to a second network path for the wireless device using a filtering traffic flow tuple comprising a unique IP-address configured for the MPTCP proxy, wherein the step of initiating the further MPTCP sub-flow comprises sending information on the IP address configured for the MPTCP proxy to the wireless device; and
relay data between the wireless device and the server, wherein data between the MPTCP proxy and the wireless device is exchanged in the MPTCP session comprising the first MPTCP subflow on the first network path and the further MPTCP subflow on the second network path and wherein data between the MPTCP proxy and the server is exchanged in the TCP session.

8. The MPTCP proxy of claim 7, wherein the processing circuitry comprises a processor and a memory containing instructions executable by said processor.

9. A method, performed in a multipath Transmission Control Protocol (MPTCP)-capable wireless device wherein the MPTCP-capable wireless device comprises a communication interface having a single IP address, wherein the communication interface is a 3GPP LTE radio interface for an LTE Packet Data Network (PDN) connection and the traffic flow tuple is a Traffic Flow Template (TFT), the method comprising:

establishing a multipath TCP (MPTCP) session to an MPTCP proxy configured to intercept a TCP connection request or an MPTCP connection request from the wireless device to a server, the MPTCP session comprising a first MPTCP subflow mapped on a first network path using a default traffic flow tuple;
including a further MPTCP subflow in the MPTCP session to the MPTCP proxy, the further MPTCP subflow mapped on a second network path using a filtering traffic flow tuple comprising a unique IP-address configured for the MPTCP proxy, wherein the step of initiating the further MPTCP sub-flow comprises sending information on the IP address configured for the MPTCP proxy to the wireless device; and
exchanging data in MPTCP session with the MPTCP proxy, filtering data on the first MPTCP subflow on the first network path and on the further MPTCP subflow on the second network path; the data being relayed to the server in a TCP flow in a TCP session between the MPTCP proxy and the server.

10. The method of claim 9, wherein an additional MPTCP flow is included in the MPTCP session between the wireless device and the MPTCP proxy on an additional network path using an additional filtering traffic flow tuple comprising an additional unique IP-address of the MPTCP proxy and a unique port number of an MPTCP port.

11. A multipath Transmission Control Protocol (MPTCP) capable wireless device comprising:
processing circuitry configured to:
establish a multipath TCP (MPTCP) session to an MPTCP proxy configured to intercept a TCP connection request or an MPTCP connection request from the wireless device to a server wherein the wireless device comprises a communication interface having a single IP address, wherein the communication interface is a 3GPP LTE radio interface for an LTE Packet Data Network (PDN) connection and the traffic flow tuple is a Traffic Flow Template (TFT), the MPTCP session comprising a first MPTCP subflow mapped on a first network path using a default traffic flow tuple;
include a further MPTCP subflow in the MPTCP session to the MPTCP proxy, the further TCP subflow mapped on a second network path using a filtering traffic flow tuple comprising a unique IP-address configured for the MPTCP proxy, wherein the step of initiating the further MPTCP sub-flow comprises sending information on the IP address configured for the MPTCP proxy to the wireless device; and
exchange data in MPTCP session with the MPTCP proxy, filtering data on the first TCP subflow on the first network path and on the further TCP subflow on the second network path; the data being relayed to the server in a TCP flow in a TCP session between the MPTCP proxy and the server.

12. The MPTCP-capable wireless device of claim 11, wherein the processing circuitry comprises a processor and a memory containing instructions executable by said processor.

* * * * *